Figures 1, 2, 3:
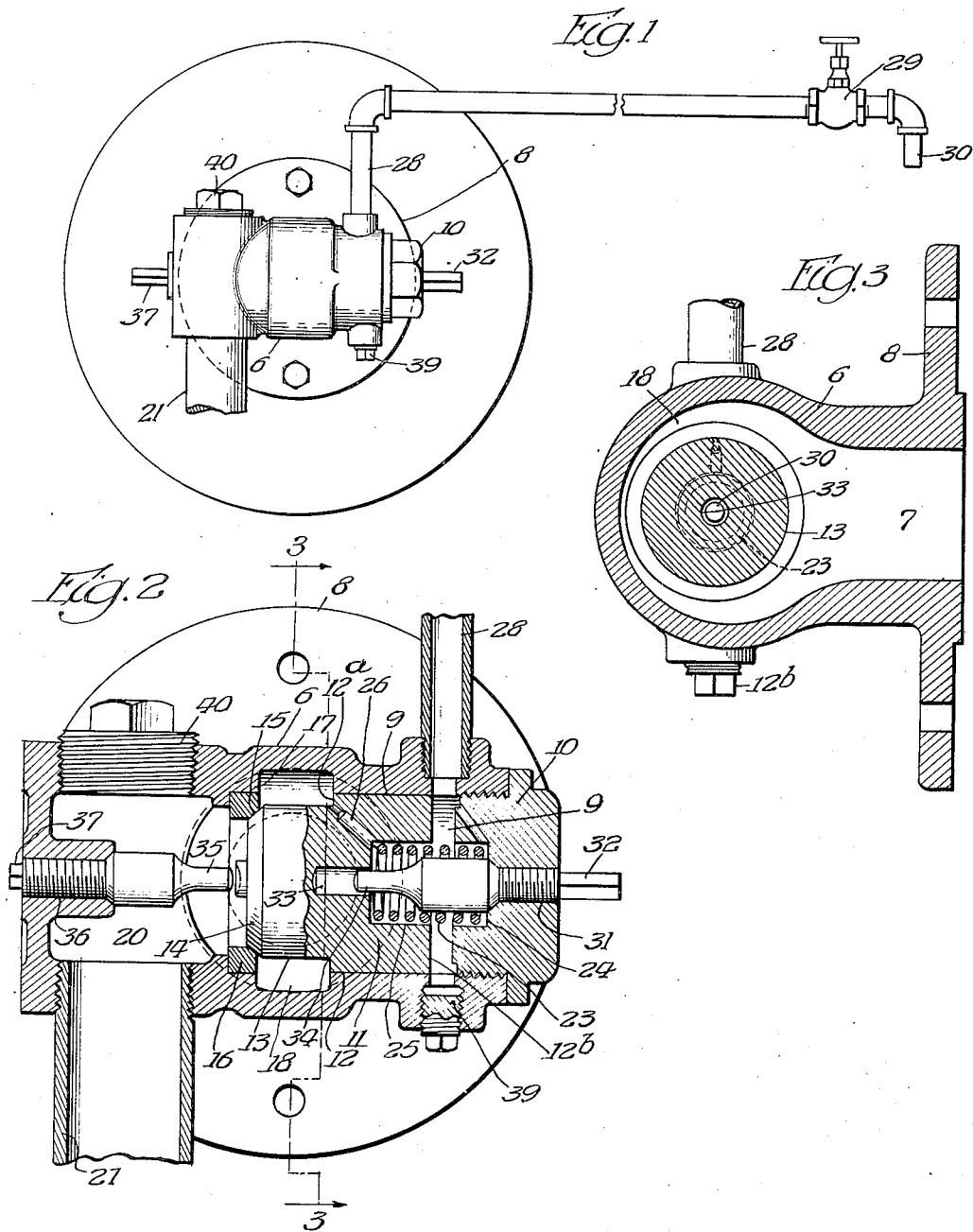

Inventors
Charles G. Learned
and Edwin L. Cull
By Fred Gerlach
their Atty

Patented Jan. 31, 1950

2,495,901

UNITED STATES PATENT OFFICE 2,495,901

BLOWOFF VALVE MECHANISM

Charles G. Learned and Edwin L. Cull, Chicago, Ill., assignors to The Okadee Company, Chicago, Ill., a corporation of Illinois Application May 4, 1944, Serial No. 534,044

1 Claim. (Cl. 137—139)

The invention relates to blow-off valve mechanism for fluid under pressure, such as steam.

One object of the invention is to provide an improved blow-off valve mechanism or system which is controllable for blowing off steam by exhausting steam therefrom through a remote operator's valve.

Another object of the invention is to provide an improved blow-off valve mechanism which is simple in construction, efficient in operation, and controllable for blowing off steam through an operator's valve to which steam in restricted flow is delivered from the inlet chamber of the blow-off valve.

Another object of the invention is to provide blow-off valve mechanism of this type which includes means for locking the blow-off valve in its closed position in the event of leakage in the pipe-line between the control valve and the blow-off valve.

Other objects of the invention will appear from the detailed description.

The invention consists in the several novel features hereinafter set forth and more particularly defined by the claim at the conclusion hereof.

In the drawings: Fig. 1 is a side elevation of a blow-off valve mechanism embodying the invention including the operator's valve for controlling the blow-off operations. Fig. 2 is a longitudinal section of the blow-off valve. Fig. 3 is a section taken on line 3—3 of Fig. 2.

The invention is exemplified with a blow-off valve which comprises a casing 6 which is provided at its back with an inlet duct 7; an integral flange 8 at the rear end of the duct 7 whereby the casing may be secured to the boiler or any other suitable connection for blow-off purposes; an annular chamber 18 into which fluid from the inlet duct 7 passes; a cylinder 9 which extends from one side of the inlet chamber 18; a ring 16 secured in a wall 17 at the opposite side of the inlet chamber 18 and provided with a conical valve-seat 15; and an outlet chamber 20 formed in one end of the casing to which the stream flows through ring 16 and which has connected thereto a discharge pipe 21 for conducting the blow-off steam to any point where it is desired to discharge the stream. A head 10 is screw-threaded into one end of the casing body and forms a closure for the outer end of the cylinder 9.

A valve-piston 11 controls the blow-off of steam from inlet chamber 18 to the outlet chamber 20. A compression coil spring 23 is confined in a socket 24 in the head 10 and a socket 25 in the piston 11 for normally pressing the closure end 14 of the piston against the seat 15 and to cut off the discharge of steam from inlet chamber 18 to the outlet chamber 20. The valve-piston 11 comprises a cylindrical member or portion 12 which is slidably fitted in the cylinder 9 at one side of the inlet chamber 18, an integral cylindrical member or portion 13 which is of lesser diameter than the cylindrical portion 12 and extends across the chamber 18, and is provided with a tapered end 14 which functions as a closure which is engageable with the valve-seat 15 on the ring 16 for cutting off the flow of steam from inlet chamber 18 to outlet chamber 20. Between the cylindrical member 12 of greater diameter and the cylindrical member 13 of lesser diameter the piston 11 is provided with an annular side portion $12^a$ which is exposed to the pressure of the steam in the annular inlet chamber 18. The outer side $12^b$ of piston-member 12 has a greater area exposed to pressure in the cylinder 9 than the opposed pressure area on the annular side portion $12^a$, so that when the pound pressure of steam against side portion $12^a$ and side $12^b$ is equal, preponderating pressure will be exerted against the side $12^b$ of the piston for holding it closed against the seat 15.

A small diagonal port 26 leading from the periphery of the piston member 13 to the socket 25 in the piston provides a passage for the restricted flow of steam from inlet chamber 18 into the cylinder 9 and against the outer side $12^b$ of the piston. This restriction of flow from inlet chamber 18 to the outer end of cylinder 9 is sufficient to cause the steam pressure against the side portion $12^a$ of the piston to shift the piston against the force of spring 23 when steam pressure against the side $12^b$ of the piston is removed by exhausting the steam from the outer end of cylinder 9.

The invention contemplates controlling the operation of the valve piston to its open position for blowing off the steam by exhausting steam from the outer end of the cylinder 9, by an ordinary remotely located operator's valve 29 which is communicatively connected by a pipe 28 to the outer end of cylinder 9 and is adapted to discharge the steam through an outlet 30 to atmosphere.

The operation will be as follows: When the operator's valve 29 is closed, steam under pressure entering the chamber 18 in the casing 6 through duct 7 will flow through the restricted duct 26 into the cylinder 9 and pipe 28. The pressure of the steam in the cylinder 9 between and against side $12^b$ of valve piston 11 will hold the valve piston closed against the seat 15 and supplement the force of the spring 23 and prevent blow-off of steam from chamber 18. When the operator desires to blow off steam, he will open valve 29. The steam in the cylinder 9 will escape freely via pipe 28, valve 29, and the outlet 30. This free discharge will be at a greater rate than the flow through the restricted orifice 26 so that there will be no substantial pressure of the steam against the side 12$^b$ of valve piston 11. The pressure of the steam in the annular chamber 18 will be sufficient to move the valve piston 11 outwardly against the loading of spring 23 and cause the end 14 of the valve-piston to move away from seat 15 in ring 16. The steam then will be blown off from annular chamber 18 through ring 16, chamber 20, and the discharge pipe 21. When the operator desires to discontinue the blow-off of steam, he will close valve 29. The steam flowing through the restricted orifice 26 will gradually build up the pressure in the cylinder 9 and against side 12$^b$ of piston 11 and in pipe 28 which will preponderate the opposed pressure against side-portion 12$^a$ of the piston and gradually move the valve-piston to its seat and discontinue the blow-off of steam from chamber 18. The valve-piston closes without hammering against the seat in the ring 16. This exemplifies a blow-off valve which is closed by steam and spring pressure and is controlled for blowing off the steam by discharging the steam to atmosphere under control of the operator's valve 29.

A stem 34 is screw-threaded at 31 to the cap 10, extends inwardly through the coil spring 23, and is provided with an outer terminal 32 whereby it may be turned to bring the inner end of the stem into engagement with the inner end of a socket 33 in the valve-piston to lock the latter closed if there is a leak or break in the pipe line 28 between the blow-off valve and the operator's valve. A stem 35 is screw-threaded at 36 through the casing 6 and provided with an outer terminal 37 by which it may be turned and an inner end which, when said stem is rotated in the casing, will abut against the inner end of the valve-piston and lock the latter in its open position for draining the blow-off valve.

The valve casing 6 is provided with screw-threaded openings for connection to the pipe 28 at opposite sides for convenience in installation and the threaded opening not used is closed by a plug 39. The casing 6 is also provided with screw-threaded openings at opposite sides for the discharge pipe 21 for convenience in installation and the opening not used is closed by a plug 40.

The invention exemplifies a blow-off valve which is held closed mainly by steam pressure and is controlled by exhausting steam to atmosphere under control of the remotely located operator's valve, is simple in construction, and operates without hammering the valve-piston against its seat. It also exemplifies a blow-off valve with a valve-piston which eliminates the necessity of packing between the piston and the casing, since leakage from the inlet chamber will be into the cylinder which receives steam through the restricted flow duct. Such leakage can be used in lieu of the restricted flow duct, but the port provides for closer control of the restricted flow. The invention also exemplifies a blow-off valve controlled by the exhaust of steam to atmosphere which is provided with means for locking the valve-piston in its closed position in the event of leakage and for holding the valve for draining the valve casing.

The invention is not to be understood as restricted to the details set forth, since these may be modified within the scope of the appended claim without departing from the spirit and scope of the invention.

Having thus described the invention, what we claim as new and desire to secure by Letters Patent is:

Blow-off mechanism for boilers, comprising: a valve casing provided with an inlet chamber; an extension communicating with said inlet chamber for communicatively connecting the inlet chamber to receive blow-off from the boiler; a cylinder at one side of the inlet chamber; a valve seat at the other side of said inlet chamber and an outlet chamber for the discharge of the blow-off; a valve-piston slidably mounted in the cylinder for engaging the valve seat and controlling the flow of blow-off steam from the inlet chamber to the outlet chamber, provided with an inner side of predetermined area exposed to the pressure of blow-off steam in the inlet chamber and an outer side having a greater exposed area in the end of the cylinder opposite the inlet chamber; a spring for urging the valve-piston to its closed position, restricted flow means for constantly conducting blow-off steam through the valve-piston from the inlet chamber to the outer end of the cylinder to exert preponderating pressure against the valve-piston to hold it normally closed and cut off the flow of blow-off to the outlet chamber, means for controlling the valve-piston for discharging blow-off, including a single pipe connected to the casing and communicating with and for exhausting steam from the outer end of the cylinder, for opening the valve-piston, and a normally closed remote control valve connected to the pipe, for retaining pressure in the outer end of the cylinder for holding the valve-piston closed and for exhausting steam from the outer end of the cylinder through the pipe for opening the valve-piston to discharge the blow-off steam, a stem screw threaded to one end of the casing for holding the valve-piston in its open position, and a stem screw threaded to the other end of the casing for holding the valve-piston in its closed position.

CHARLES G. LEARNED.
EDWIN L. CULL.

REFERENCES CITED

The following references are of record in the file of this patent:

UNITED STATES PATENTS

| Number | Name | Date |
|--------|------|------|
| 493,774 | Howes | Mar. 21, 1893 |
| 572,297 | Hennebohle | Dec. 1, 1896 |
| 880,030 | Learith | Feb. 25, 1908 |
| 926,389 | Collin | June 26, 1909 |
| 1,146,012 | Mason | July 13, 1915 |
| 1,241,037 | Shark | Sept. 25, 1917 |
| 1,303,045 | Dieter | May 6, 1919 |
| 1,460,746 | Carlstedt | July 3, 1923 |
| 1,924,733 | Brock | Aug. 29, 1933 |

FOREIGN PATENTS

| Number | Country | Date |
|--------|---------|------|
| 500,667 | Great Britain | Feb. 14, 1939 |